(12) United States Patent
Bowman

(10) Patent No.: US 6,189,856 B1
(45) Date of Patent: Feb. 20, 2001

(54) PRESSURE RELEASE VALVE

(75) Inventor: John Bowman, Grantham (GB)

(73) Assignee: McCain Foods Limited, Florenceville (CA)

( * ) Notice: Under 35 U.S.C. 154(b), the term of this patent shall be extended for 0 days.

(21) Appl. No.: 09/147,493

(22) PCT Filed: Jun. 19, 1997

(86) PCT No.: PCT/CA97/00426

§ 371 Date: Mar. 10, 1999

§ 102(e) Date: Mar. 10, 1999

(87) PCT Pub. No.: WO98/01692

PCT Pub. Date: Jan. 15, 1998

(30) Foreign Application Priority Data

Jul. 9, 1996 (GB) .................................................. 9614421

(51) Int. Cl.[7] .............................................. F16K 31/122
(52) U.S. Cl. ............................................. 251/54; 251/48
(58) Field of Search .................................. 251/48, 54, 50

(56) References Cited

U.S. PATENT DOCUMENTS

| 833,473 | * | 10/1906 | Mesta ...................................... 251/48 |
| 839,862 | * | 1/1907 | Locke ...................................... 251/48 |
| 1,525,859 | * | 2/1925 | Ferrari ................................. 251/48 X |
| 1,827,725 | * | 10/1931 | Baker ...................................... 251/50 |
| 2,728,547 | | 12/1955 | Cookston et al. . |
| 2,778,598 | | 1/1957 | Bolling, Jr. . |
| 3,024,801 | | 3/1962 | Carls . |
| 3,064,675 | * | 11/1962 | Johnson et al. ..................... 251/54 X |
| 3,147,827 | * | 9/1964 | Weisheit ................................. 251/54 |
| 3,243,156 | | 3/1966 | Shoemaker . |
| 3,531,078 | * | 9/1970 | Hose et al. ............................ 251/54 |
| 4,303,378 | * | 12/1981 | Hunter ........................ 251/625.43 X |
| 4,484,545 | | 11/1984 | Madsen . |
| 4,566,273 | * | 1/1986 | Baumeler .......................... 251/48 X |
| 5,253,671 | * | 10/1993 | Kolenc .............................. 251/331 X |
| 5,292,103 | | 3/1994 | West et al. . |

* cited by examiner

Primary Examiner—Kevin Shaver
Assistant Examiner—John Bastianelli
(74) Attorney, Agent, or Firm—Bereskin & Parr

(57) ABSTRACT

A pressure release valve for a steam peeler for potatoes has a differential piston assembly including a piston which is movable between an open position and a closed position under steam control, and a fixed piston element which is received in a secondary cylinder within the main piston for defining a chamber that progressively reduces in volume as the main piston moves towards its open position. The chamber receives a cushioning fluid for decelerating the piston as it moves towards the open position.

12 Claims, 5 Drawing Sheets

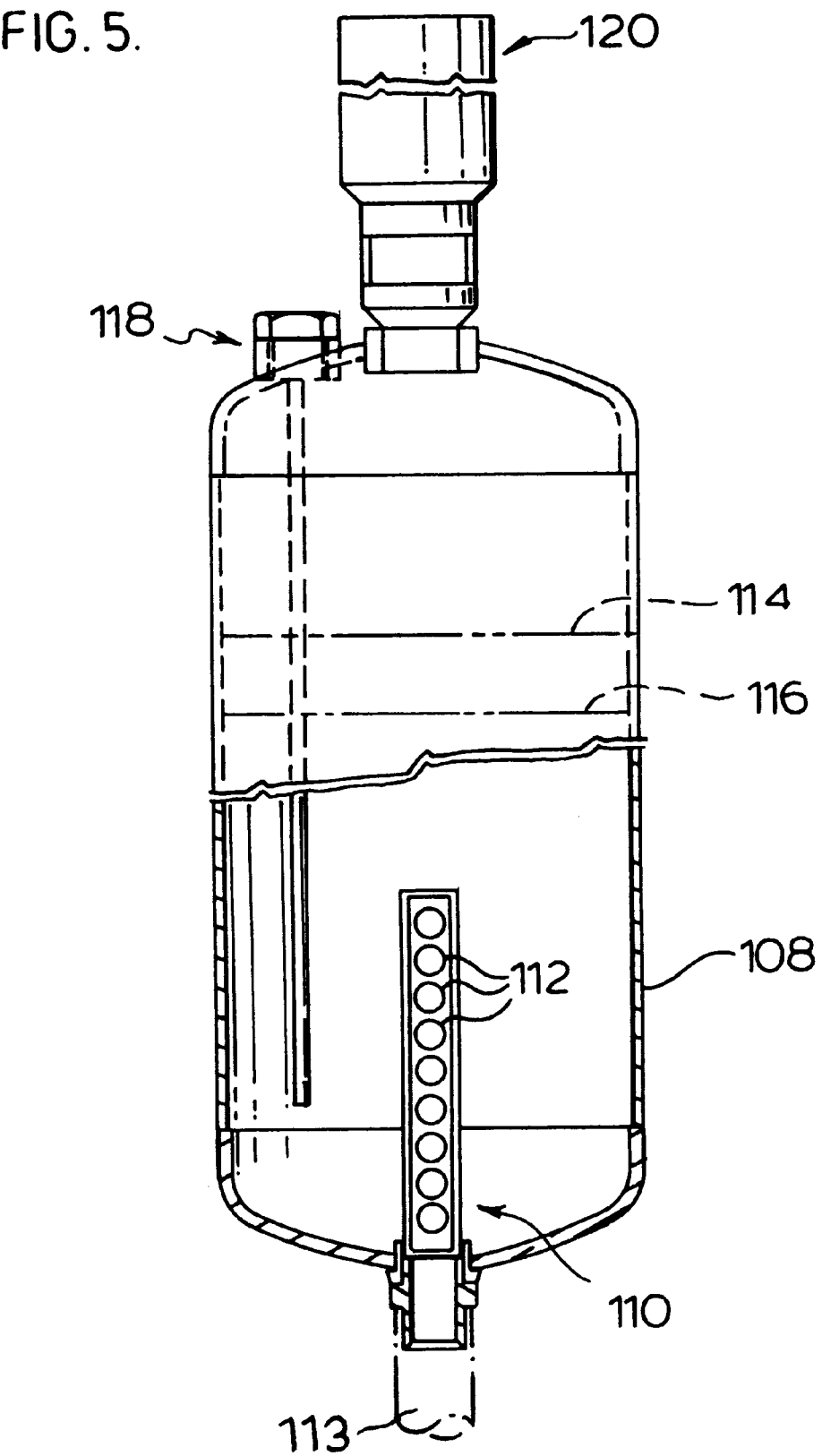

PRESSURE RELEASE VALVE

TITLE: PRESSURE RELEASE VALVE

This invention relates generally to fluid pressure release valves. The invention has been devised primarily in the context of steam peeling equipment used for removing skins from potatoes or other hard produce. However, it is to be understood that the invention is not limited to this particular application.

Steam peelers are well-known in the art of potato processing. Essentially, a steam peeler comprises a large pressure vessel into which successive batches of potatoes are introduced. A batch may comprise approximately 500 Kg of potatoes. After a batch of potatoes has been loaded, the vessel is sealed and saturated steam is introduced under pressure to a level of approximately 13 or 14 bar. The vessel is rotated to ensure steam contact with the potatoes. This steaming phase lasts a relatively short period of time, for example, about 35 seconds. The pressure is then abruptly released, which causes the potato skin to be explosively separated from the remainder of the vegetable.

Precise control of the operating parameters of the peeler is necessary in order to ensure that, on the one hand, the skins are completely removed from the potatoes while, on the other hand, undue amounts of the vegetable itself are not removed with the skins. Abrupt release of the pressure is particularly important. Conventionally, the pressure vessel is fitted with a rotary pressure release valve for this purpose. Commercial valves generally have been found to have a minimum valve exhaust time in the range of five to seven seconds (the time for 14 bar pressure within the vessel to decay to 0.5 bar). While this is adequate, it is believed that improved performance can be achieved with shorter valve exhaust times.

Valve life has also been found to be relatively short with conventional valves. For example, a typical maximum life may be about 600 hours of operation. Not only are the valves expensive to replace, but significant "down time" is required to replace a valve.

Examples of prior art steam peelers are shown in U.S. Pat. Nos. 4,064,794 and 4,091,722, (both to Kunz) and also in U.S. Pat. No. 4,188,869 (Komen). These patents relate primarily to closure devices for the opening in the pressure vessel through which the potatoes are loaded into and removed from the vessel, rather than to pressure release valves as such.

Other U.S. patents of background interest are as follows:

U.S. Pat. No. 2,728,547 (Cookston et al.)
U.S. Pat. No. 2,778,598 (Bolling)
U.S. Pat. No. 3,024,801 (Carls)
U.S. Pat. No. 3,243,156 (Shoemaker)
U.S. Pat. No. 4,484,545 (Madsen)
U.S. Pat. No. 5,292,103 (West et al.)

In general, these patents failed to address the need for a pressure release valve that is suitable for use on the pressure vessel of a steam peeler and that provides for a very short valve exhaust time.

Accordingly, an object of the present invention is to address these shortcomings of the prior art by providing an improved pressure release valve that is suitable not only for a steam peeler pressure vessel but also for other pressure release applications.

The pressure release valve provided by the invention has a valve body with a port for communicating with a pressurized fluid. The valve body also includes a cylinder receiving a piston which is movable between the first position for sealing the valve port and a second position clear of the port. The piston is movable to the second position by the pressure of the fluid. The valve body includes vent means communicating with the port when the piston is in its second position, for venting of the fluid from the valve. The piston forms part of a differential piston assembly which also includes a fixed piston element in the cylinder. The piston element and the piston together define a chamber for containing a cushioning fluid, which has a maximum volume when the piston is in its first position and a minimum volume when the piston is in its second position. Means is provided for controlling flow of fluid out of the chamber for cushioning movement of the piston. The valve also includes piston actuating means for maintaining the piston in its first position when the port is to be sealed, the actuating means being releasable to allow the piston to move to its second position under the influence of the pressurized fluid when the pressure of the fluid is to be released.

In other words, the invention essentially provides a differential piston pressure release valve in which the piston can abruptly be driven by the pressurized fluid from the "valve closed" position to the open position when the piston actuating means is released. At the same time, movement of the piston is cushioning by the cushioning fluid so as to minimize the risk to damage of the valve that would occur if unrestrained movement were possible.

In a steam peeler, the piston may be steam actuated using an external steam supply, i.e. not the steam from the pressure vessel. In this case, the piston will be held in its first (closed) position by the pressure of the externally supplied steam. When the steam supply is terminated, the pressure of the steam within the vessel will drive the piston to its second (open) position. A valve of the form provided by the invention may be used to control the supply of steam for actuating the piston, as well as for releasing pressure from the pressure vessel.

It should be noted that, in other applications, the piston actuating means may be designed to release the piston at a pre-determined threshold pressure, in which case, the valve would in fact operate as a pressure relief valve.

In order that the invention may be more clearly understood, reference will now be made to the accompanying drawings which illustrate a particular preferred embodiment of the invention by way of example, and in which.

Figure 1:
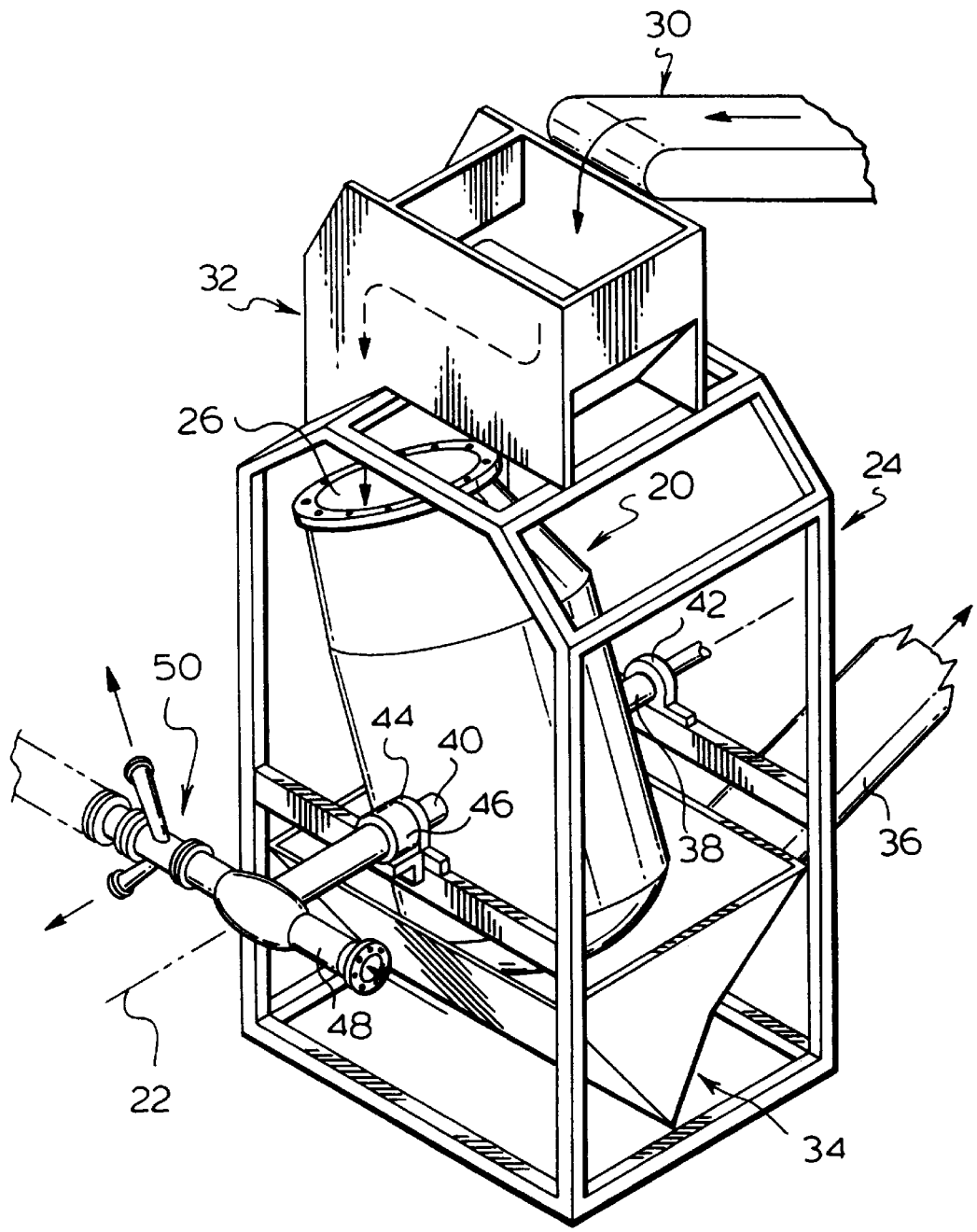
FIG. 1 is a schematic perspective view of a conventional steam peeler fitted with a release valve of the form provided by the present invention.

Reference will first be made to FIG. 1 in describing a conventional steam peeler. The peeler includes a pressure vessel 20 which is supported for rotation about a horizontal axis 22 in a frame 24. The vessel has a somewhat cylindrical overall shape with an opening 26 at one end which can be closed by a lid (not shown). Potatoes to be loaded into the vessel are delivered by a conveyor generally indicated at 30 into an inlet hopper 32 supported at the top of frame 24, by which the potatoes are directed into opening 26. Below the vessel is a discharge hopper 34 having an associated discharge conveyor 36.

Vessel 20 is supported for rotation about axis 22 on what are in effect a pair of stub shafts 38 and 40 that project from opposite sides of the vessel and are carried in respective bearings 42 and 44 on frame 24. Stub shaft 38 is in fact a drive shaft and is coupled to an external drive motor (not shown) by which the vessel can be rotated about axis 22. Stub shaft 40 is hollow and communicates with the interior of the vessel, providing a conduit through which steam can be introduced into and exhausted from the vessel. A rotary coupling 46 connects shaft 40 with external pipework including a steam inlet 48 and a pressure release or "dump" valve 50 of the form provided by the invention. Valve 50 is shown in detail in FIGS. 2, 3 and 4.

Apart from valve 50, a steam peeler as shown in FIG. 1 is entirely conventional. Briefly, potatoes to be peeled are introduced into the vessel 20 from conveyor 30, via hopper 32. Typically, each batch of potatoes may be approximately 500 Kg in weight. The vessel is closed and saturated steam is introduced under pressure through inlet 48 until the pressure within the vessel 20 is approximately 13 to 14 bar. Valve 50 is closed at this time.

Vessel 20 rotates for a relatively short "steaming" period (e.g. about 35 seconds) during and following introduction of steam to ensure steam contact with the potatoes. A steam valve (not shown) associated with inlet 48 is closed when the desired pressure level has been reached. At the end of the steaming phase, valve 50 is abruptly opened, exhausting steam from the vessel to atmosphere. As explained previously, this causes the skin to be explosively removed from the potatoes. At this point in its cycle, the vessel 20 is in an inverted position with opening 26 at the bottom. The lid 28 is opened and the peeled potatoes and skins are discharged into hopper 34 for removal by conveyor 26. The vessel then returns to the generally upright position shown ready to receive the next batch of potatoes, and the cycle is repeated.

Figure 2:
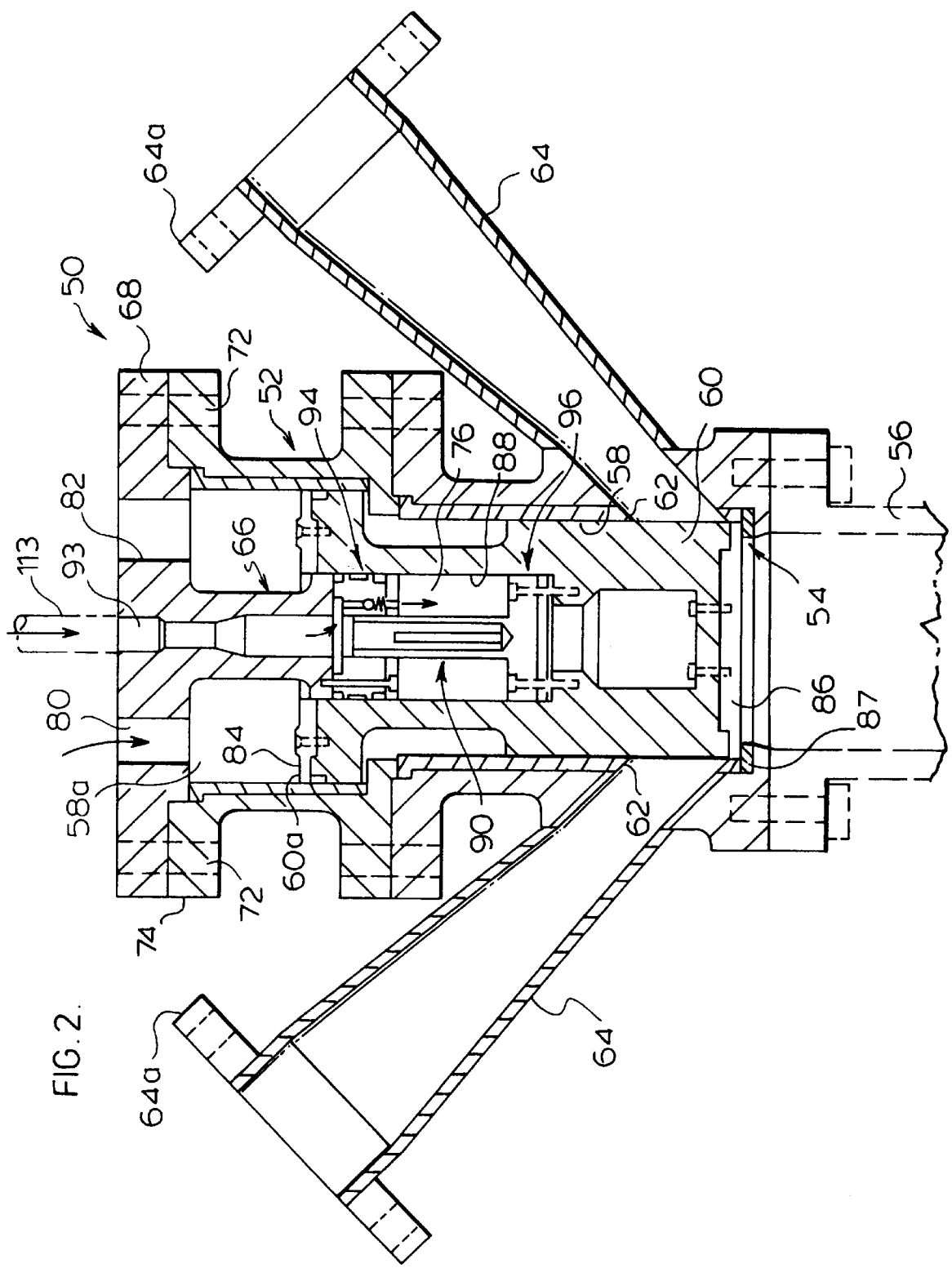
FIGS. 2 and 3 are schematic longitudinal sectional views through the release valve shown in FIG. 1, the valve being shown in the closed position in FIG. 2 and in the open position in FIG. 3.
Figure 3:
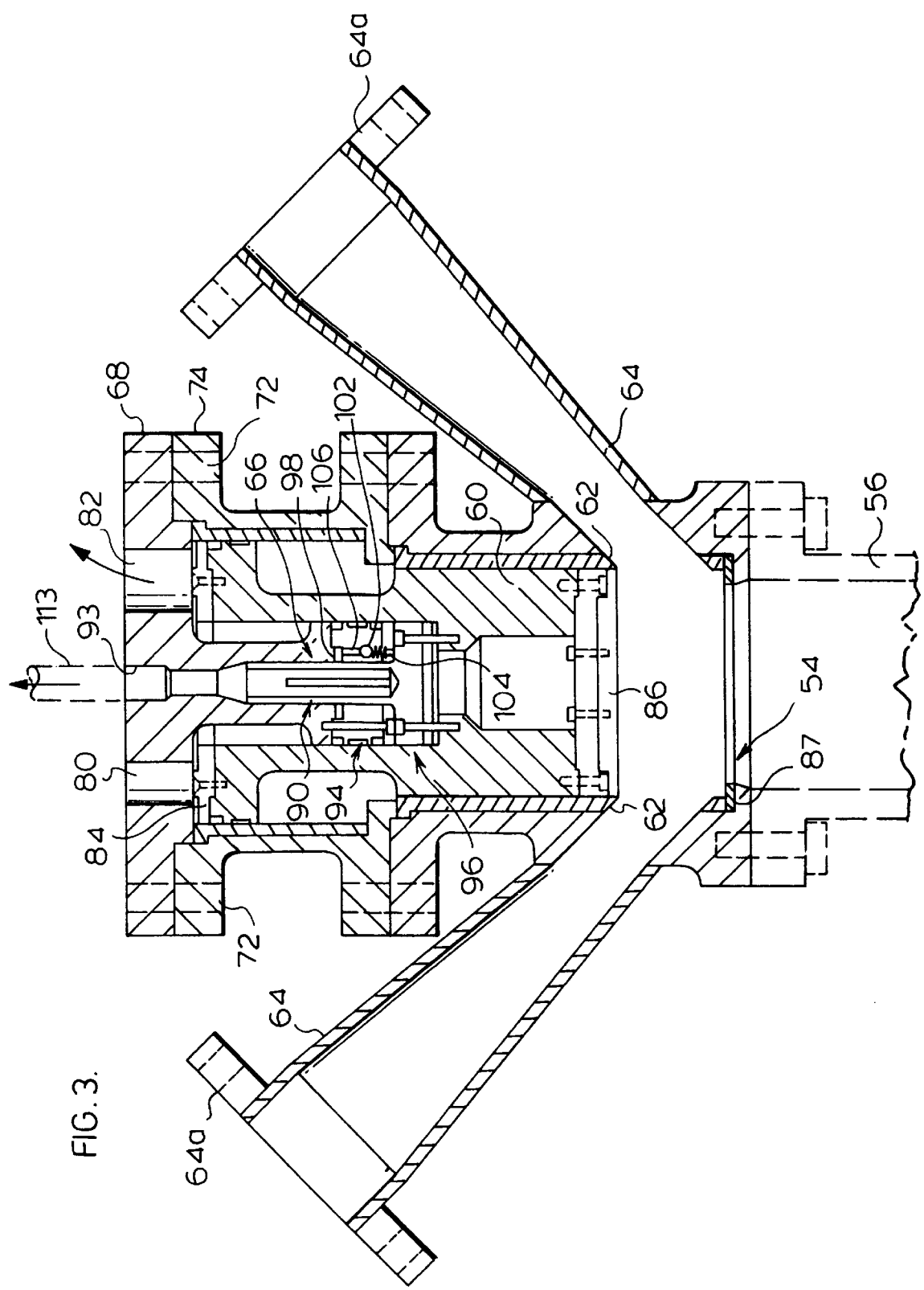

Valve 50 is shown in FIGS. 2 and 3 respectively in the closed position (during introduction of steam into vessel 20) and in the open position (for exhaust of steam from vessel 20). In both views, the valve is shown oriented at 90° with respect to the orientation shown in FIG. 1. Valve 50 includes a valve body which is generally denoted 52 and which has an inlet port 54 for communicating with the pressurized steam. The valve body is shown bolted in place on a coupling 56 which communicates with the interior of pressure vessel 20 (see also FIG. 1). The valve body includes a cylinder 58 extending inwardly of the valve body from port 54. A piston 60 is movable in the cylinder between a first position shown in FIG. 2 in which it closes and seals port 54, and a second position shown in FIG. 3 in which the piston is disposed clear of port 54 for venting of steam from the pressure vessel. In use, the piston 60 is movable from the closed position of FIG. 2 to the open position of FIG. 3 by the pressure of the steam acting on the piston.

The valve body includes a pair of opposed vent openings 62 which are disposed immediately above port 54. As best seen in FIG. 3, the openings 62 are fully exposed when the piston 60 is in its second (open) position. The openings 62 communicate with respective steam outlets 64 that are of progressively increasing internal cross-section in a direction away from the opening 62, so as to avoid imparting any back pressure on the steam that is being exhausted from the peeler vessel. Flanges 64a are provided at the distal ends of the outlet 64 for coupling to external pipe work (not shown).

Piston 60 forms part of a differential piston assembly which also includes a fixed piston element 66 that extends downwardly into the cylinder 58 from a flange 68 at the top of the valve body 52. The piston element 66 and the flange 68 are formed as one piece, which is held in place by bolts extending through aligned openings 72 in the flange 68 and a corresponding flange formation 74 at the top of valve body 52. For convenience of illustration, various bolts used in assembling the valve body are not shown.

The piston 60 and the piston element 66 together define a chamber 76 which has a maximum volume when the piston is in the first (closed) position of FIG. 2, and a minimum volume when the piston 60 is in the second (open) position of FIG. 3. As will be described in more detail later, chamber 76 receives a hydraulic fluid (oil) which cushions the movement of piston 60 from the closed position to the open position during venting of steam from the peeler vessel. Briefly, chamber 76 communicates with a reservoir of hydraulic fluid (FIG. 5) and the flow of hydraulic fluid from chamber 76 to the reservoir is throttled to control the speed of movement of piston 60. As indicated previously, it is desirable that the valve open in a very short period of time. However, if the movement of the piston is not cushioned, the impact forces caused by the valve opening could lead to damage of the valve parts and reduced service life.

In this embodiment, the valve is steam actuated. In other words, the piston 60 is moved towards and maintained in its first (closed) position by steam. When this steam supply is terminated, the piston is returned towards its second (open) position by the pressure of the steam within the peeler vessel acting on the bottom face of piston 60. Steam for actuating the piston is introduced into the upper region of cylinder 58 through a steam inlet port 80 in the flange 68 at the top of the valve body. In FIG. 2, this upper region of cylinder 58 is denoted 58a. The steam acts on an annular top surface 60a of piston 60 surrounding piston element 66. Flange 68 also includes a steam exhaust port 82 through which steam can leave cylinder region 58a when the valve is to be opened. Appropriate auxiliary valves (not shown) are provided for controlling admission of steam through port 80 and exhaust through port 82. These valves may be conventional steam valves or differential piston valves of the form provided by the invention.

Replaceable "sacrificial" wear plates 84 and 86 are provided on the top and bottom faces respectively of piston 60 for combatting the abrasive effect of steam on the piston. Port 54 is fitted with a replaceable seal 87 of rubber-like material, preferably impregnated with metal particles, e.g. copper impregnated PTFE.

Figure 4:
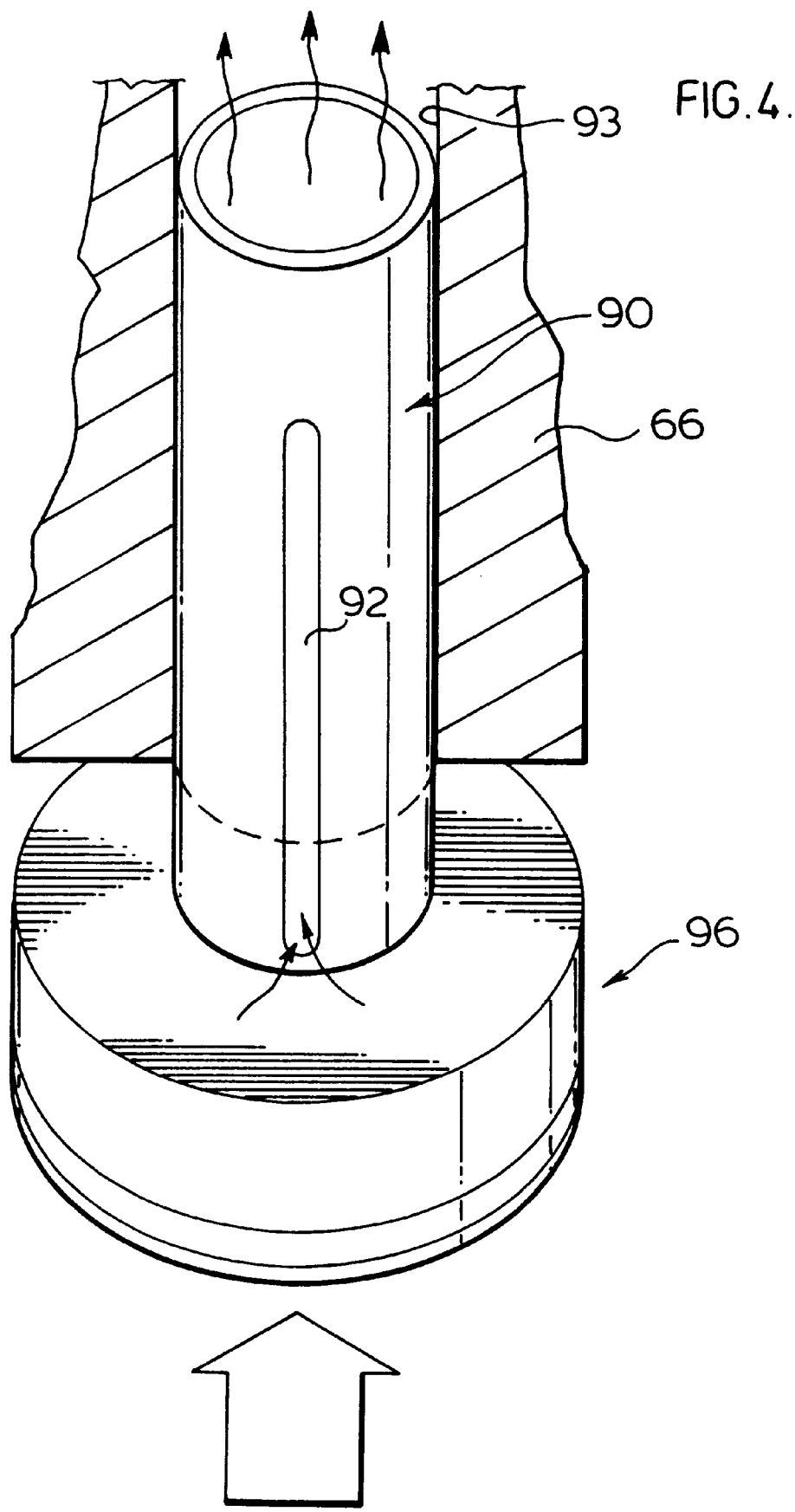
FIG. 4 is a detail perspective view, partly broken away, of part of the valve of FIGS. 2 and 3; and, FIG. 5 is a schematic vertical sectional view through the cushioning fluid reservoir of the valve of FIGS. 2, 3 and 4.

Referring in more detail to the hydraulic cushioning arrangement for the piston 60, it will be seen that the fixed piston element 66 is in fact accommodated within an auxiliary cylinder 88 formed within piston 60 and opening into its top end. As best seen in FIG. 4, a hollow cylindrical formation 90 extends upwardly from the bottom wall of the auxiliary cylinder and is formed with an axial slot 92 through which hydraulic fluid can flow into the interior of the formation and, from there, into a hydraulic oil passageway 93 within the fixed piston element 66. Formation 90 in fact slides vertically upwardly within passageway 93 as the piston 60 rises and that the slot 92 is progressively covered to a greater extent by the surrounding part of the piston element. This effectively reduces the cross-sectional area through which oil can flow as the piston rises, progressively throttling the flow hydraulic fluid. This increases the cushioning effect and decelerates the piston 60 as it reaches the fully open position. One or more slots additional to slot 92 can be provided and the dimensions of these slots can be selected to provide the required deceleration effect.

FIG. 3 shows the piston 60 in the fully open position. The fixed piston element 66 is fully "bottomed" within the auxiliary cylinder 88. The opposing faces at the bottom of element 66 and in the bottom wall of the auxiliary cylinder 88 comprise respective assemblies of annular plates generally indicated at 94 and 96 in FIG. 3. Formation 90 is carried by assembly 96.

Assembly 94 incorporates an annular oil gallery 98 that communicates with the hydraulic fluid in passageway 93 and, via a check valve, with the space between the bottom end of piston element 66 and the bottom wall of auxiliary cylinder 88. The check valve comprises a ball 102 that is biassed upwardly by a spring 104. As piston 60 is moved downwardly by steam entering through port 80 there is a downward suction effect on the ball 102. This opens an auxiliary passageway 106 communicating with oil gallery 98, which allows additional hydraulic fluid to flow downwardly as the volume of chamber 76 increases, reducing the resistance to such downward movement that otherwise would occur.

FIG. 5 shows what is essentially a conventional hydraulic fluid reservoir 108. A sparge tube 110 extends upwardly from the bottom of the reservoir and provides an inlet/outlet for hydraulic fluid. Tube 110 is provided, within the reservoir, with a number of openings 112 and is connected by a flexible hydraulic hose 113 (FIGS. 2 and 3) to the passageway 93 in the fixed piston element 66. Thus, hydraulic fluid can flow freely between the reservoir and the passageway 93 as piston 60 moves between its open and closed positions. The chain dotted line denoted 114 in FIG. 5 shows a "high" fluid level corresponding to the valve open position of FIG. 3, while line 116 indicates a low level corresponding to the valve closed position of FIG. 2.

Reservoir 108 has an oil dipstick 118 and an air vent at the top, which is fitted with a silencer 120.

In practical tests, it has been found that the pressure release valve of the invention offers a number of advantages as compared with conventional rotary valves. Exhaust time can be reduced to less than one second compared with five to seven seconds minimum using a conventional rotary valve. Not only does this result in improved peeling performance but the cycle time of the peeler overall can be reduced by about 10%. It has been estimated that reducing the exhaust time of the valve can reduce peel loss by between about 0.5 and 0.25%. It may also be possible tor reduce steaming time as less steam penetration may produce the same peel loss as current steaming time. Valve life may also be extended.

It should of course be noted that the preceding description relates to a particular preferred embodiment of the invention and that many modifications are possible within the broad scope of the claims. For example, while a steam actuated valve has been described, the valve could be actuated by other pressurized fluids or in other ways, e.g. mechanically or electrically. Also, the valve could be designed as a pressure relief valve, i.e. a valve that would open at a pre-set pressure threshold. Also, as noted previously, the valve is not limited in its application to steam peelers but may be used in other pressure release environments, and for releasing the pressure of fluids other than steam (including liquids). Flow of cushioning fluid could be controlled in other ways, e.g. by a fixed restrictor or a simple overflow.

I claim:

1. A pressure release valve comprising:
    a valve body having a port for communicating with a pressurized fluid, and including a cylinder;
    a piston which is movable in the cylinder between a first position in which it seals the port and a second position clear of the port, the piston being movable to said second position by the pressure of said fluid;
    vent means in the valve body communicating with said port when the piston is in its second position, for venting of said fluid from the valve;
    said piston forming part of a differential piston assembly which also includes a fixed piston element carried by said valve body, said piston element and piston together defining a chamber which has a maximum volume when the piston is in its first position and a minimum volume when the piston is in its said second position, for receiving a cushioning fluid;
    means for controlling flow of said cushioning fluid out of the chamber so as to cushion movement of the piston towards its second position; and,
    piston actuating means maintaining the position in its said first position when the port is to be sealed, said actuating means being releasable to allow the piston to move to its said second position under the influence of said pressurized fluid when the pressure of the fluid is to be released.

2. A valve as claimed in claim 1, wherein said piston has a first end for sealing with said port, and a second end remote from said first end, and wherein the piston includes a secondary cylinder opening into said second end of the piston, said secondary cylinder receiving said fixed piston element for defining said chamber receiving said cushioning fluid.

3. A valve as claimed in claim 2, further comprising a reservoir for said cushioning fluid, and means providing communication between said reservoir and said chamber including a fluid passageway of defined cross-sectional area, and throttle means for progressively reducing the said cross-sectional area as the piston travels towards its said second position, for decelerating the piston.

4. A valve as claimed in claim 3, wherein said passageway includes a portion which extends axially through said fixed piston element, and a formation in said secondary cylinder which extends into said passageway and includes a slot through which cushioning fluid enters the said passageway as the piston moves towards its said second position, said slot being progressively covered by the fixed piston element for effecting said reduction in the cross-sectional area of said passageway.

5. A valve as claimed in claim 4, wherein said fluid passageway includes means for by-passing said throttle means, and means for closing said by-pass when the piston is moving from its said first position to its said second position, and for opening said by-pass when the piston is moving in the reverse direction.

6. A valve as claimed in claim 1, wherein said piston actuating means includes steam inlet means at an end of said cylinder remote from said port, for driving the piston towards its said first position, and steam outlet means for exhausting said supplied steam to allow said piston to move to its said second position under the influence of said pressurized fluid.

7. A valve as claimed in claim 2, wherein said piston actuating means includes steam inlet means at an end of said cylinder remote from said port, for driving the piston towards its said first position, and steam outlet means for exhausting said supplied steam to allow said piston to move to its said second position under the influence of said pressurized fluid, and wherein said piston is provided with an annular face surrounding said secondary cylinder providing a surface against which steam is directed for moving the piston towards its first position.

8. A valve as claimed in claim 6, wherein said annular surface is provided with a replaceable sacrificial wear plate.

9. A valve as claimed in claim 1, wherein said piston has a leading end face for sealing said port, and wherein said leading end face is provided with a replaceable sacrificial wear plate.

10. A valve as claimed in claim 1, wherein said vent means comprises at least one vent opening in said valve body, and a vent outlet which extends outwardly from said opening and which is of progressively increasing cross-sectional area in a direction away from said port for minimizing back pressure to venting of said pressurized fluid.

11. A valve as claimed in claim 1, wherein said port is provided with a replaceable seal comprising a rubber-like material impregnated with metal particles.

12. A valve as claimed in claim 11, wherein said rubber-like material is PTFE and said metal articles are copper.

* * * * *